US010105686B2

(12) United States Patent
Najbar et al.

(10) Patent No.: US 10,105,686 B2
(45) Date of Patent: Oct. 23, 2018

(54) MONOLITHIC CATALYST FOR SIMULTANEOUS REMOVAL OF $NO_X$ AND CARBON PARTICLES, ESPECIALLY FROM OFF-GASES OF CARBON POWER PLANTS AS WELL AS THE MANNER OF PRODUCTION OF THE MONOLITHIC CATALYST FOR SIMULTANEOUS REMOVAL OF $NO_X$ AND CARBON PARTICLES, ESPECIALLY FROM OFF-GASES OF CARBON POWER PLANTS

(71) Applicant: Uniwersytet Jagiellonski, Cracow (PL)

(72) Inventors: Mieczyslawa Najbar, Cracow (PL); Jaroslaw Dutkiewicz, Cracow (PL); Tomasz Wilkosz, Cracow (PL); Elzbieta Bielanska, Cracow (PL); Aleksandra Weselucha-Birczynska, Cracow (PL); Józef Camra, Cracow (PL); Janusz Danko, Cracow (PL); Jakub Bartyzel, Cracow (PL)

(73) Assignee: UNIWERSYTET JAGIELLONSKI, Cracow (PL)

( * ) Notice: Subject to any disclaimer, the term of this patent is extended or adjusted under 35 U.S.C. 154(b) by 10 days.

(21) Appl. No.: 14/436,059

(22) PCT Filed: Jun. 5, 2014

(86) PCT No.: PCT/PL2014/050035
§ 371 (c)(1),
(2) Date: Apr. 15, 2015

(87) PCT Pub. No.: WO2014/196883
PCT Pub. Date: Dec. 11, 2014

(65) Prior Publication Data
US 2016/0096165 A1    Apr. 7, 2016

(30) Foreign Application Priority Data

Jun. 5, 2013 (PL) .......................... 404146

(51) Int. Cl.
*B01J 23/889* (2006.01)
*B01J 37/12* (2006.01)
(Continued)

(52) U.S. Cl.
CPC ........ *B01J 23/8892* (2013.01); *B01D 53/865* (2013.01); *B01D 53/8628* (2013.01);
(Continued)

(58) Field of Classification Search
CPC ........ B01J 23/8892; B01J 35/04; B01J 37/12; B01J 37/18; B01J 37/08; B01J 37/06;
(Continued)

(56) References Cited

U.S. PATENT DOCUMENTS

| 3,810,754 A | 5/1974 | Ford et al. |
| 3,969,480 A | 7/1976 | Fedor et al. |

(Continued)

FOREIGN PATENT DOCUMENTS

| DE | 2200507 A1 | 7/1972 |
| WO | 2013022359 A1 | 2/2013 |
| WO | 2013085402 A1 | 6/2013 |

OTHER PUBLICATIONS

Precision Steel Warehouse 321 Steel Data Sheet, http://www.precisionsteel.com/stainless-steel/type-321.*
(Continued)

*Primary Examiner* — James Fiorito
(74) *Attorney, Agent, or Firm* — Walker & Jocke

(57) ABSTRACT

A monolithic catalyst for simultaneous removal of $NO_x$ and carbon particles, especially from off-gases of carbon power plants contains the monolith is made from acid-proof aus-
(Continued)

tenitic steel. The catalyst is a two-phase one; moreover, it contains the phases $NiFe_2O_4$ and $Fe_2O_3(Mh)$ with spinel structure, and these phases form microcrystallites, additionally containing Mn.

The manner of production of the monolithic catalyst for simultaneous removal of $NO_x$ and carbon particles, especially from off-gases of carbon power plants depends on the monolith is subject to oxidation after which the resulting oxide layers are washed with the solution of nickel salts; later the monolith is baked in the oxidising atmosphere with the view to inserting nickel ions into the oxide layer; finally this obtained oxide layers are subject to reduction.

6 Claims, 5 Drawing Sheets

(51) Int. Cl.
| | |
|---|---|
| B01J 37/18 | (2006.01) |
| B01J 21/00 | (2006.01) |
| B01J 23/755 | (2006.01) |
| B01J 35/00 | (2006.01) |
| B01J 35/04 | (2006.01) |
| B01J 37/02 | (2006.01) |
| B01D 53/86 | (2006.01) |
| C23C 8/10 | (2006.01) |
| C23C 8/80 | (2006.01) |
| B01J 37/06 | (2006.01) |
| B01J 37/08 | (2006.01) |
| B01J 35/10 | (2006.01) |

(52) U.S. Cl.
CPC ........... *B01J 21/005* (2013.01); *B01J 23/755* (2013.01); *B01J 35/002* (2013.01); *B01J 35/04* (2013.01); *B01J 37/0201* (2013.01); *B01J 37/0207* (2013.01); *B01J 37/06* (2013.01); *B01J 37/08* (2013.01); *B01J 37/12* (2013.01); *B01J 37/18* (2013.01); *C23C 8/10* (2013.01); *C23C 8/80* (2013.01); *B01D 2255/20738* (2013.01); *B01D 2255/20753* (2013.01); *B01D 2255/405* (2013.01); *B01D 2258/0283* (2013.01); *B01J 35/0053* (2013.01); *B01J 35/1004* (2013.01)

(58) Field of Classification Search
CPC ...... B01J 21/005; B01J 23/755; B01J 35/002; B01J 37/0201; B01J 37/0207; B01D 53/8628; B01D 53/865; C23C 8/10; C23C 8/80
See application file for complete search history.

(56) References Cited

U.S. PATENT DOCUMENTS 4,017,336 A  4/1977 Foroulis
4,021,372 A  5/1977 Meguerian et al.

OTHER PUBLICATIONS

American Metal Co. 321 Steel Data Sheet, https://www.metalshims.com/t-321-Stainless-Steel-technical-data-sheet.aspx.*
International Search Report for App. No. PCT/PL2014/050035 dated Sep. 15, 2014.
Polish Patent Office Search report for App. No. P.404146 dated Mar. 24, 2014.

* cited by examiner

MONOLITHIC CATALYST FOR SIMULTANEOUS REMOVAL OF $NO_X$ AND CARBON PARTICLES, ESPECIALLY FROM OFF-GASES OF CARBON POWER PLANTS AS WELL AS THE MANNER OF PRODUCTION OF THE MONOLITHIC CATALYST FOR SIMULTANEOUS REMOVAL OF $NO_X$ AND CARBON PARTICLES, ESPECIALLY FROM OFF-GASES OF CARBON POWER PLANTS

The object of invention is a monolithic catalyst for simultaneous removal of $NO_x$ and carbon particles, especially from off-gases of carbon power plants- on the acid-proof steel baseThe technology called $DeNO_x$ is commonly used for the removal of nitric oxide from stationary emission sites, such as power plants, CHP plants, waste incineration plants, or nitric acid factories. The basis of this technology is the reduction of nitric oxide with ammonia on catalysts on the basis of divanadium pentaoxide placed on the anatase form of $TiO_2$. The catalysts currently used in this technology usually contain, apart from divanadium pentaoxide (in the amount lower than 1%), also significant amounts of tungsten trioxide (ok.10%) or molybdenum trioxide (ok. 6%) (Appl. Catal. 222 (2001) 221-236, P. Forzatti). The trioxides increase the activity and thermal stability of catalysts and they decrease the oxidation of $SO_2$ to $SO_3$, leading to the formation of ammonium sulphate deposits. Apart from that, $MoO_3$ prevents the deactivation of catalysts by arsenic compounds, if they are present in exhaust gases (Chemiker Zeitung 2 (1991) 33, E. Hums).

Recent publications of patent applications concerning the catalysts on the basis of divanadium pentaoxide point to the possibility of a favourable modification of the synthesis method or the modification of the quantity and quality of promoters (e.g. the publication WO 2013002492 (A1)). The application US 2011250114 (A1) also reveals the simultaneous use of molybdenum trioxide and tungsten trioxide, as well as the components decreasing the volatility of molybdenum trioxide.

The surface of oxide V-W catalysts on ceramic monoliths in $DeNO_x$ technology may be blocked both by the ammonium sulphate which is being created and by small particles of soot passing through electrostatic precipitators. Moreover ammonia is quite an expensive reducer, which requires costly dispensing devices and which also contaminates the air, thus having negative impact on human respiratory system.

It is possible to place the catalyst on the surface and/ or in the pores of ceramic monolith channels. According to the description of the Polish patent PL 199013 B1, it was placed on the surface of metallic monolith channels. However, ceramic carriers are quite fragile, and their walls are quite thick.

Therefore an ideal solution would be a durable monolithic catalyst on the metallic film basis.

On the other hand, nitric oxide formed from oxygen and nitrogen in a highly endothermic process contains high internal energy. Thus it should be easily reduced into oxygen and nitrogen using an appropriate catalyst. The electron structure of this oxide particle shows that its lowest unoccupied orbitals are the anti-bonding JI orbitals. Therefore the richer in electrons (the more reduced) the surface oxide cation adsorbing the NO particle is, the easier the dissociation of NO particle adsorbed on the surface oxide cation (Catal. Today 73 (2002) 249-254, M. Najbar et al.). Since between 2 and 7% of oxygen is present in off gasses of stationary emission sources, the maintenance of a high status of reduction of the oxide catalyst surface can only be achieved if the operating temperature of the catalyst is high enough to maintain the oxygen pressure in the gas phase lower than the balance pressure of oxygen over oxide, or otherwise an additional reducer needs to be used.

The direct reduction of NO in dusty off-gases containing carbon particles could take place without the need to introduce the additional reducer at temperatures in which they are capable of oxide surface reduction. It is highly probable that the reduction takes place with the help of carbon oxide, formed in the previous NO reduction on carbon particles and/or as a result of reaction of particles with atomic forms of oxygen forming on the oxide surface (J. Phys. Chem. B 103 (1999) 3434 T. Kyotani & A. Tomita). Thus an optimum decomposition on NO can be expected within the range of temperatures in which $O_2$ dissociation on the oxide and NO decomposition on carbon particles activated by the dissociated oxygen on the oxide occur simultaneously.

In US 20060073964 (A1) and in US 20070025901 noble metals on oxygen carriers were described as the catalysts for the direct decomposition of nitric oxide without an additional reducer in the atmosphere containing oxygen.

On the other hand, in EP 0526099A1 and in EP 0679427A1 silver or silver oxide on oxide carriers were described as catalysts for the direct decomposition of nitric oxide without the additional reducer in the atmosphere containing oxygen, and in KR 101011830 (B1) such catalysts were metal oxides containing transition metals in the hydrotalcite structure.

Mixed oxide catalysts with spinel structure were proposed for the direct NO decomposition in the presence of reducing factors (JP 7284663, JP 10180105).

Direct NO decomposition at temperatures lower than the temperatures of oxygen dissociation were observed on mixed V-W oxide catalysts (PP 2006-344611).

The test of direct NO decomposition on soot using activated oxygen on $\alpha Fe_2O_3$ was described in a number of publications (Applied Catalysis B:

Environmental 80 (2008) 248-259 D. Reichert et al., Applied Catalysis B: Environmental 84 (2008) 803-812 D. Reichert et al.).

Also the decomposition of NO without the presence of oxygen on metallic iron was examined (Chemical Engineering Science, 53 (1998) 1481-1489, A. N. Hayhurst et al. and Fuel 89 (2010) 3505-3509, B. Gradoń et al.)

DETAILED DESCRIPTION

Figure 1:
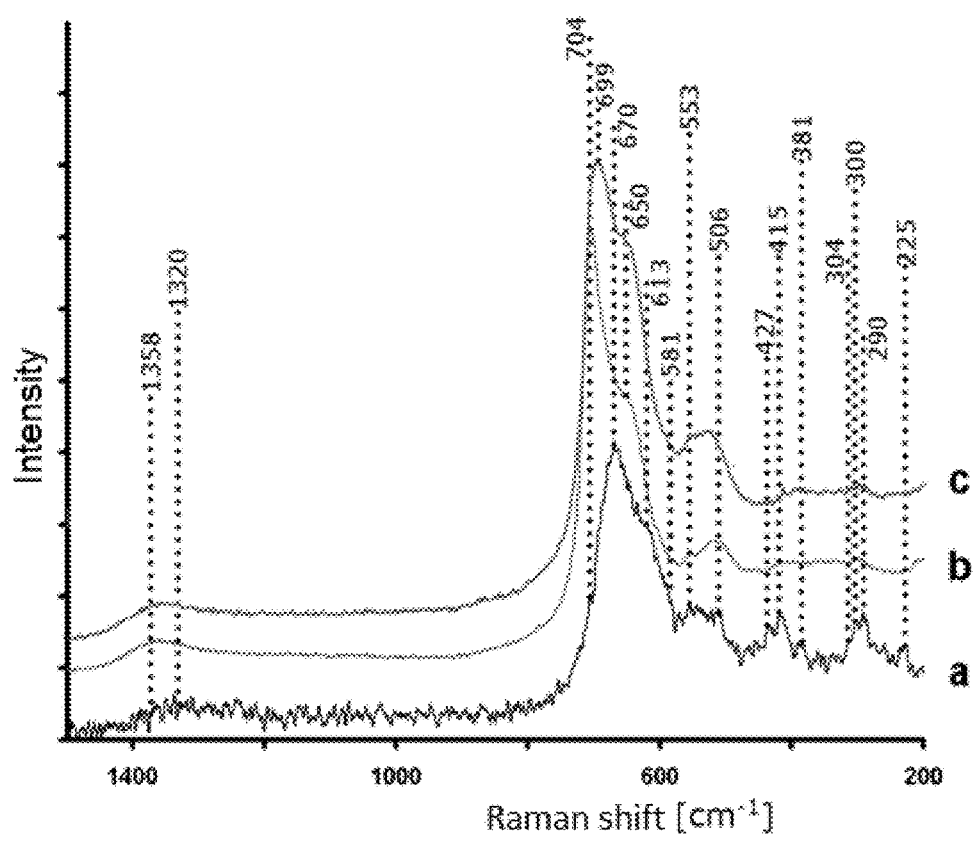
FIG. 1 describes some Raman spectra for oxygen layers on the oxidized film (O) (a), film re-oxidized after the washing of the primary oxygen layer with nickel acetate solution (OP) (b), and the re-oxidized film that has been subject to reduction with hydrogen (OPR) (c).

Unfortunately, none of the above-mentioned catalysts has been used on an industrial scale.

The objective of the invention was the development of synthesis of a monolithic catalyst, containing the oxide phase on a monolithic steel structure, characterised in its reduced state by high activity in direct NO decomposition and high, stable selectiveness towards nitrogen in carbon particles contained in off-gases.

The monolithic catalyst for simultaneous removal of $NO_x$ and carbon particles, especially from off-gases of carbon power plants according to the invention contains a monolith from acid-proof steel, formed by alternately laid bands of sinusoidally corrugated and smooth film. The alternately laid bands are preferably folded using 'a double S method' and they form monolithic cylindrical cubes in a cylinder casing and/ or they can be placed in a cuboidal casing, forming monolithic cuboidal cubes.

Preferably steel with the following composition should be used: app. 2.0% Mn, 0.8% Si, 0.045% P, 0.03% S, 0.3% Cu, 19.0% Cr, 10.0% Ni and 0.8% Ti. The most preferred option is austenitic steel 1H18N9T/1.4541/AISI 321.

The oxygen layer of the catalyst is located on the surface of monolith channels, which contains the phases with spinel structure ($NiFe_2O_4$ and $FeCr_2O_4$); these phases form microcrystallites, additionally containing Mn. The proper oxide surface of the catalyst shall be preferably between 1 and 5 $m^2/g$ and it shall be between 0.1 and 0.4 μm thick.

The manner of production of a monolithic catalyst for simultaneous removal of $NO_x$ and carbon particles from off-gases of carbon power plants according to the solution consists in forming a monolith by the alternate laying of band of sinusoidally corrugated and smooth film. The alternately laid bands are folded using 'a double S method' and are placed in a cylinder casing, thus forming monolithic cylindrical cubes, or they can be placed in a cuboidal casing, forming monolithic cuboidal cubes. Preferably steel with the following composition should be used: 2.0% Mn, 0.8% Si, 0.045% P, 0.03% S, 0.3% Cu, 19.0% Cr, 10.0% Ni and eventually 0.8% Ti. The most preferred option is austenitic steel H18N9T/1.4541 or 1H18N9/1.4541.

The oxide phase is produced directly on the monolith from acid-proof steel by oxidising in the time of heating with the velocity of between 2 and 6 grades/minute up to the temperature of 700-800° C. and subsequent baking in this temperature in the period of between 2 and 6 hours in the atmosphere containing oxygen. After the monolith has been cooled down to room temperature at the velocity of furnace cooling, the oxygen layer formed on the surface of monolith channels is washed with nitric salt solution by means of immersing the monolith in it. After the monolith has been dried in the air at room temperature in the period of between 2 and 6 hours, it is again heated up in the air flow using thermal programming up to the temperature of between 700 and 800° C. and it is baked in the final temperature in the period of 2-6 hours. After the furnace has cooled down to room temperature, the air is removed from it by passing hydrogen at the velocity of 200-300 $cm^3$/min during 1 hour, after which the catalyst is heated in the hydrogen flow (90-250 $cm^3$/min) at the velocity of 2-6° C./min. up to the temperature of 500° C., and it is baked in this temperature during 0.5-1.5 hours.

Preferably the monolith should be baked in the air atmosphere flowing at the speed of 90-150 $cm^3$/min.

Preferably the monolith should be baked in the air flow with the temperature up to do 730-750° C.

Preferably the shape and the dimensions of the monolith shall strictly match the shape and the dimensions of the furnace chamber.

Preferably nickel acetate solution should be used for washing the oxide layer.

Preferably the time of monolith immersion in the nickel salt solution should be between 1 and 4 seconds.

Preferably the concentration of nickel ions in the solution should be between 0.1 and 0.25 mole /$dm^3$.

Preferably the reduction temperature should be 500° C.

As a result of the acid-proof steel baking process, the primary oxide layer is formed on the surface of steel channels, which exposes mainly magnetite and hematite, but probably also manganese ferrite. The dominating phase in the oxide layer formed as a result of washing the primary layer and subsequent oxidation of the film is the spinel phase of nickel ferrite $NiFe_2O_4$ with the admixture of the $Fe_2O_3$ phase with the spinel structure called megahemite (mh). The atoms of Cr, MN and Ti are dissolved in these phases. The reduction with hydrogen causes the diffusion of chromium, manganese and titanium into the crystallites of the oxide layer, which leads to the increase of surface concentration of iron and nickel.

The spinel catalyst on the basis of acid-proof steel is characterised by good activity in the area of simultaneous decomposition of NO and oxidation of carbon particles at relatively low temperatures (300-350° C.) in off-gases from carbon power plants.

Thin, compact layers of the oxide catalyst according to the invention with the thickness ranging between 0.1-0.4 μm, formed on monolith channel walls do not chip off and they offer good protection against further corrosion to the metal surface below them.

Other benefits of the proposed oxide catalyst on the monolith from acid-proof steel are the simplicity of its synthesis and relatively low cost.

The morphology of catalyst surface and the thickness of the active oxygen layer has been examined using scanning electron microscopy (SEM), combined with energy dispersive X-ray spectroscopy (EDS).

The phase composition of superficial oxide layers has been examined using Raman spectroscopy method. The chemical composition of surface oxide nanolayers has been defined using the X-ray photoelectron spectroscopy (XPS).

The optimum speed of direct NO decomposition is achieved at temperatures at which the greatest concentrations of atomic oxygen forms are expected on the oxide surface and simultaneously carbon is oxidised using atomic oxygen forms adsorbed on the oxide surface. The layers of the oxide catalyst (Mn—Fe—Cr—Ni), formed on the walls of monolith channels expose spinel phases with great surface reduction, which facilitates the transmission of electrons to the adsorbed electron-acceptor particles. The proposed monolithic catalyst on the basis of film from acid-proof steel exposes spinel phases on the surface, containing mainly nickel Ferrite $NiFe_2O_4$, and iron chromate ($FeCr_2O_4$ as well as manganese oxides. These phases form microcrystallites, which also additionally contain Mn.

An additional benefit of the proposed Cr—Mn—Fe—Ni—Ti oxide catalyst on the monolith from acid-proof steel is the simplicity of its synthesis and relatively low cost of substrates used in it.

The object of the invention has been presented in the following execution examples.

EXAMPLE 1

Figure 2:
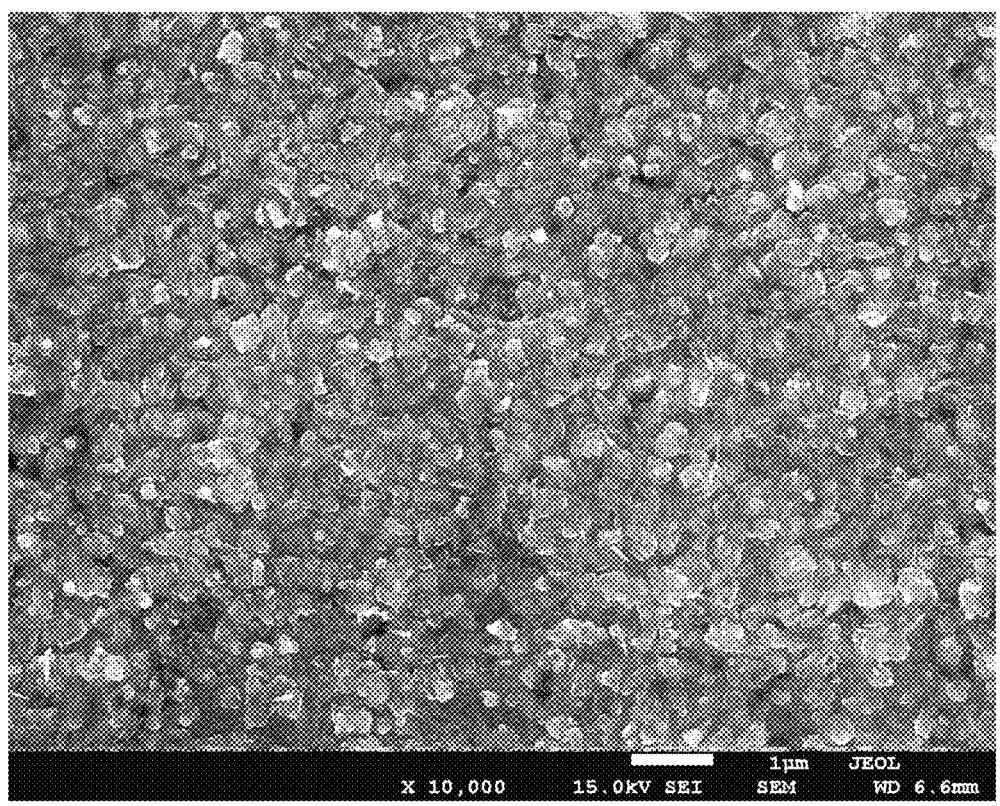
FIG. 2 describes the SEM image in the secondary electrons (SE) of the oxide layer on the surface of the OP film.

Three strips of film from acid-proof 1H18N9T/1.4541 steel were subject to heating using thermal programming up to the temperature of 740° C. with the velocity of 3°/min they were baked the final temperature during 4 hours. After the furnace has cooled down, one of the strips was safeguarded for further testing, and the oxygen layers on the two remaining film strips were washed with 0.1 m solution of $Ni(CH_3COO)_2$ by means of immersion in this solution in the time of 2 seconds.. After the strips have dried, they were again subject to heating using thermal programming up to the temperature of 740° C. in the air flow and to baking in this temperature during 4 hours. After the furnace has cooled down in the air flow (after app. 4 hours), one of the strips was safeguarded for further testing. The oxygen layer on the film strip that remained in the furnace was subject to reduction. To this end first the air at room temperature was removed from the furnace by passing hydrogen at the velocity of 200 $cm^3$/min during 1 hour. Then the reduction of oxygen layers that formed on the film was executed, by heating it using thermal programming up to the temperature of 500° C. with the velocity of 3° C./min in the air flow and by subsequent baking in this temperature during 1 hour, in hydrogen flow.

film can be attributed to the diffusion processes in the oxide phases, induced by reduction. (Test results of this catalyst using scanning electron microscopy combined with energy dispersive X-ray spectroscopy provide information on the morphology of its surface and the thickness of oxide layer. FIG. 2 presents the SEM image in the secondary electrons (SE) of the oxide layer on the surface of the OP film. The combined crystallites of the oxide phase tightly cover the surface of crystal film grains. EDS (Energy Dispersive Spectroscopy) analysis of micro-areas of this film enabled to estimate the thickness of oxide layer using Anderson-Hasler formula (X-ray Optics and Microanalysis, 1966, 310 Herman ed., Paris C. Anderson, M. Hasler) as equal to app. 0.3 µm.

EXAMPLE 2

The analysis of surface nanolayers of the following oxide layers"was conducted using XPS method.

Table 1 lists the energy of 2p electron bindings for iron, chromium, manganese, titanium, and nickel, as well as relative percentage share of these elements in the analysed oxide nanolayers.

TABLE 1

2p electron binding energies and percentage share of different metals in surface oxide nanolayers on the film from 1H18N9T steel with the thickness of 0.05 mm

| | Fe | | Cr | | Mn | | Ti | | Ni | |
|---|---|---|---|---|---|---|---|---|---|---|
| Film | BE [eV] | Share [% at.] | BE [eV] | Share [% at.] | BE [eV] | Share [% at.] | BE [eV] | Share [% at.] | BE [eV] | Share [% at.] |
| O | 709.0 710.9 | 1 7 | 575.7 | 56 | 640.2 | 29 | 457.7 | 6 | 853.7 | 1 |
| OP | 709.0 710.8 | 5 18 | 575.7 | 21 | 640.5 | 43 | 457.8 | 4 | 854.6 | 9 |
| OPR | 709.0 710.8 | 15 10 | 575.4 | 20 | 640.0 | 42 | 456.8 | 3 | 854.0 | 10 |

The obtained Raman spectra for oxygen layers on the oxidised film (O) (a), film re-oxidised after the washing of the primary oxygen layer with nickel acetate solution (OP) (b) and the re-oxidised film and then subject to reduction with hydrogen (OPR(c) have presented in FIG. 1.

Peak positions of the following phases have been marked above the maximum spectra values: hematite, $\alpha Fe_2O_3$, (Phys. Rev. B 41 (1990) 7822-7827 M. J. Massem et al.) (225, 290, 300, 415, 506, 613 and 1320 $cm^{-1}$), magnetite, $Fe_3O_4$, (Journal of Solid State Chemistry 174 (2003) 424-430 O. N. Shebanova et al.) (670, 553, 506, 427 i 304$cm^{-1}$). nickel ferrite, $NiFe_2O_4$, (J. Raman Spectrosc. (2010), (wileyonlinelibrary.com) DOI 10.1002/jrs.279.1 A. Ahlawat & V. G. Sathe) (699, 650 sh and 581 $cm^{-1}$) megahemite, $Fe_2O_3$, with the spinel structure (J. Raman Spectrosc.28 (1997) 873-878 D. L. A. De Faria et al.) (704, 650sh, 1358$cm^{-1}$)

As it can be easily observed, the main phases of the oxide layer of the O film are hematite and magnetite.The spinel phase with the $NiFe_2O_4$ network parameters dominates in the oxide layer of the OP film, apart from the small quantity of megahemite. The formation of nickel ferrite indicates high nickel content in the surface layers of salt crystallites, caused by the strong segregation of nickel (low Tamman's temperature) and its low participation in the formation of the primary oxide layer (low oxygen affinity). The dominating phase of the oxide layer of the OPR film is also nickel ferrite. Small differences in the peak positions in relation to the positions observed in the case of oxygen phase on the OP As it can easily be observed, the composition of surface oxide nanolayers strongly depends on their previous thermal treatment. In the surface nanolayers of the O film the concentration of elements with higher oxygen affinity, Cr, Mnand Ti, is much higher than on the surface nanolayers of the initial film (Cr-6% at.; Mn-2% at; Ti 0.2% at.) (Adv. Mat. Res. 651 (2013) 319 E. Bielańska et al.), which indicates their surface segregation induced by oxidation High content of Cr, Mn and Ti in surface nanolayers of $NiFe_2O_4$ and Fe2O3-maghemite crystallites, present on the OP and OPR film, indicates heir strong surface segregation induced by oxidation, which takes place as a result of diffusion through spinel structures.. Cation substitution of manganese in spinel structures was previously observed in a powder catalyst with a similar composition by means of the transmission electron microscopy (TEM) combined with EDS and the diffraction of electrons (patent claim P.395905). The reduction of oxide layers manifests itself in the decrease of 2p electrons binding energy of all metals, and it is accompanied by a slight reduction of metal concentration with the highest oxygen affinity (Cr, Mr and Ti).

EXAMPLE 3

The activity of two-phase catalyst ($NiFe_2O_4$—$Fe_2O_3$ (mh)) was tested, obtained in compliance with example 1, with simultaneous decomposition of NO and oxidation of carbon particles in the atmosphere of off-gases from carbon power plants. Exhaust gases were directed using a fan to a cylindrical reactor containing 5 cylindrical cubes of monolithic catalyst with the diameter of 9.8 cm, the height of 3 cm and the volume of 226 cm³. The by-pass structure included flow and gas pressure meters as well as the pressure drop meter on a catalyst bed, the indications of which served as the test of dust sedimentation on the surface of monolith channels of catalyst cubes.

The tests were conducted using the by-pass of the exhaust channel from the carbon incinerator. The measurements were conducted within the range of 250-450° C. for NO concentrations, which during the measurements at each specified temperature (250, 300, 350, 400 and 450° C.) varied within the ranges of 200-400 ppm. At the same time, $SO_2$ concentrations varied within the ranges of 160-250 ppm. A portable HORIBA PG-250 gas analyser was used for the measurement of NOx, $SO_2$, $O_2$ and $CO_2$ concentrations. The measurements were conducted for the range of 5150-19250 h$^{-1}$ volume flows. These flows, apart from the lowest one, were close to or higher than the typical flows in exhaust gas channels of carbon power plants.

Figure 3:
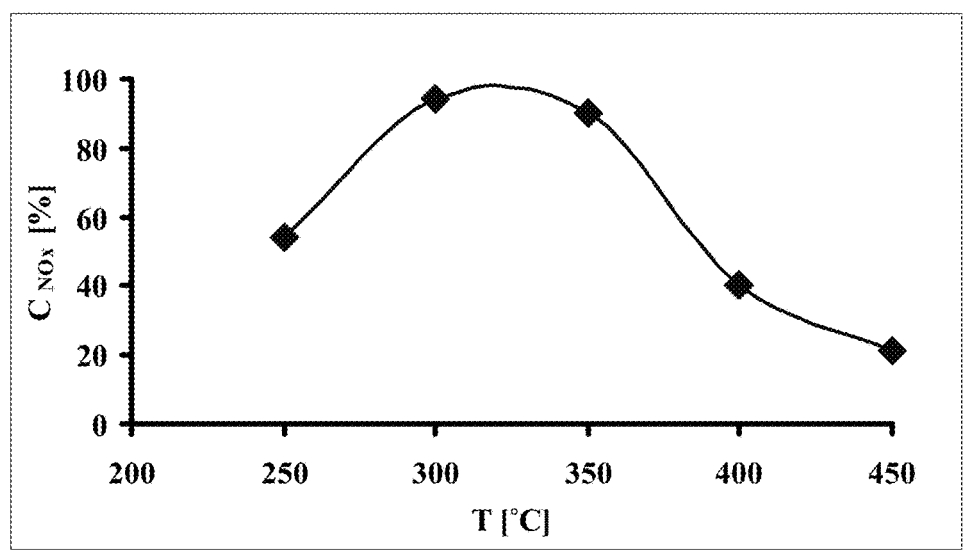
FIG. 3 describes the temperature dependency of $NO_x$ conversion.

FIG. 3. specifies the temperature dependency of $NO_x$ conversion.

Figure 4:
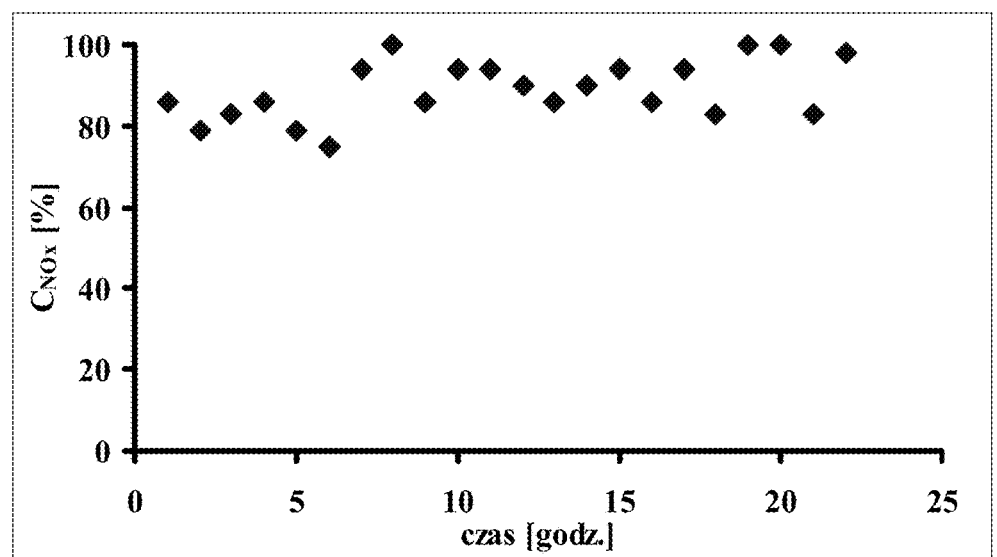
FIG. 4 describes the stability of $NO_x$ at 350° C.

As it can easily be observed, $NO_x$ decomposition occurs most rapidly in temperatures of 300 and 350° C. Its stability in time at the temperature of 350° C. was presented in FIG. 4. The lack of deactivation under the impact of oxygen originating from NO decomposition suggests that it is used for the oxidation of carbon nanoparticles, sedimenting on the surface of thecatalyst.

Figure 5:
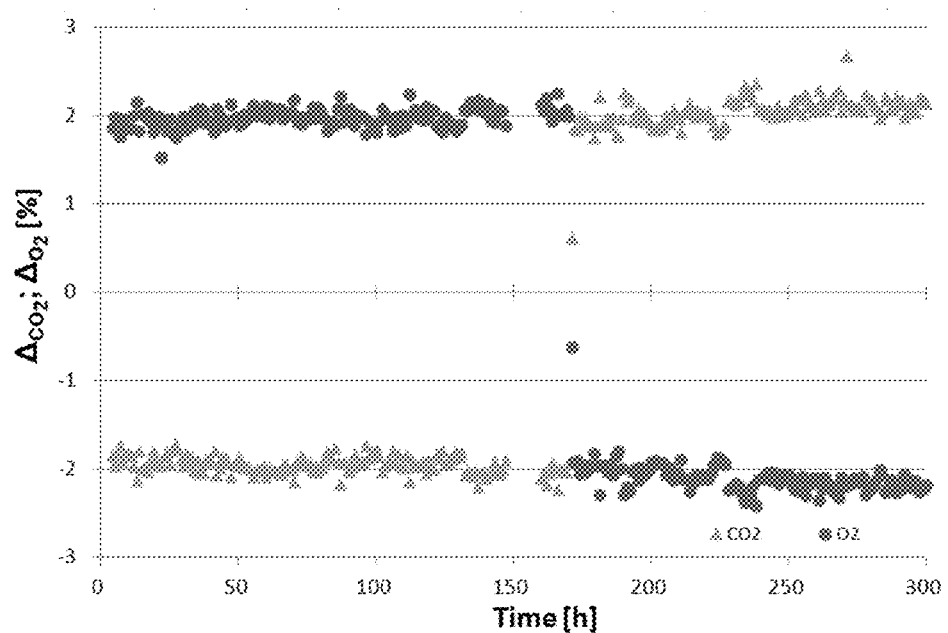
FIG. 5 describes the changes of $CO_2$ and $O_2$ concentrations under the reaction between off-gases and the catalyst at 400° C.

FIG. 5 presents the changes in $CO_2$ and $O_2$ concentrations ($\Delta(CO_2$ and $\Delta(O_2)$) under the reaction between off-gases and the catalyst at 400° C., in the time trace. The increase of $CO_2$ concentration by app. 2% observed during the first 169 hours is accompanied by the decrease of $O_2$ concentration also by app. 2% ($\Delta(CO_2)=-\Delta(O_2)$), which indicates catalytic oxidation of carbon particles to carbon dioxide. In the period exceeding 169 hours the velocity of carbon particles oxidation increases first, and then the dissociation of carbon dioxide into carbon and oxygen begins. This indicates that a gradual evolution of catalyst surface takes place at 400° C., which leads to the creation of strong electron-donor centres capable of dissociating also $CO_2$ on that surface. This gradual evolution of the catalyst surface at higher temperatures is probably the reason for its lower activity in $NO_x$ decomposition. This type of evolution of catalyst surface was not observed at temperatures of 300 and 350° C.

Therefore it can be concluded that at the temperatures of 300-350° C. the catalyst described in the invention can be used for simultaneous $NO_x$ and carbon nanoparticles removal from off-gases from carbon power plants As Kyotani and Tomita claim (J. Phys. Chem. B 103 (1999) 3434 T. Kyotani & A. Tomita), atomic forms of oxygen adsorbed on oxide phases diffuse onto the surface of carbon particles, which leads to the oxidation of surface parts of carbon atoms. This in turn leads to such modification of the surrounding of the remaining C atoms that they are transformed into active centres of NO dissociation, At the same time CO formed on the carbon surface removes the excess of active oxygen from the oxide surface, thus exposing metal atoms, which become active centres of NO dissociation. Synergetic reaction between oxide phases and carbon particles seems to be responsible for the highest $NO_x$ conversion value, observed at 300° C. (FIG. 3). The above solution based on Kyotani and Tomita's works is the only explanation for the synergy of oxide and carbon phases in NO decomposition. Activated oxidation of carbon particles can also occur with the help of $NO_2$, which is formed as a result of the reaction between NO particles and the atomic oxygen adsorbed on the oxide surface (Appl. Catal. B 92 (2009) 126 I. Atribak et al.).

The invention claimed is:

1. A method comprising:
   a) oxidizing a monolith,
      wherein the monolith comprises Cr-Ni acid-proof austenitic steel foil
      wherein the austenitic steel foil comprises Fe and approximately 2.0% Mn, 0.8% Si, 0.045% P, 0.03% S, 0.3% Cu, 19.0% Cr, 10.0% Ni, and 0.8% Ti,
      wherein oxidation of the monolith creates at least one oxide layer on the foil,
   b) washing the at least one oxide layer of the monolith with a solution including nickel ions,
   c) annealing the monolith in an oxidizing atmosphere,
   d) during at least a portion of (c), introducing nickel ions into the at least one oxide layer during annealing of the monolith in the oxidizing atmosphere,
   e) subsequent to (d) reducing the at least one oxide layer.

2. The method according to claim 1, wherein in (a), the oxidation of the monolith is conducted in an air flow while the monolith is heated to a temperature range of 700-800° C. at an increasing rate of 2-6° C. per minute, and wherein in (c) the annealing of the monolith in the oxidizing atmosphere is carried out at 700-800° C.

3. The method according to claim 1, wherein the monolith includes channel walls, and wherein the at least one oxide layer is created on the channel walls of the oxidized monolith in (a) and wherein the channel walls are washed in (b) with a solution of nickel ions having a concentration of 0.1-0.25 mol/dm³.

4. The method according to claim 1 wherein subsequent to (b), after washing of the at least one oxide layer with the solution including nickel ions, in (c) the monolith is heated up to 700-800° C. and subsequently annealed at 700-800° C. for 2-6 hours.

5. The method according to claim 1, wherein in (e), the reduction of the at least one oxide layer with the introduced nickel from (d) is carried out in flowing hydrogen gas.

6. The method according to claim 1, wherein in (e), the reduction of the at least one oxide layer with the introduced nickel from (d) is conducted while heating the monolith to a temperature of 400-600° C. for 0.5-4.5 hours.

* * * * *